(12) United States Patent
Fischer et al.

(10) Patent No.: US 10,605,632 B2
(45) Date of Patent: Mar. 31, 2020

(54) STACKABLE DUAL-THREADED BUSHING AND SPACER ASSEMBLY

(71) Applicant: Teledyne Scientific & Imaging, LLC, Thousand Oaks, CA (US)

(72) Inventors: Lisa L. Fischer, Ventura, CA (US); Sam R. Hoffman, Ventura, CA (US)

(73) Assignee: Teledyne Scientific & Imaging, LLC, Thousand Oaks, CA (US)

(*) Notice: Subject to any disclaimer, the term of this patent is extended or adjusted under 35 U.S.C. 154(b) by 291 days.

(21) Appl. No.: 15/636,323

(22) Filed: Jun. 28, 2017

(65) Prior Publication Data

US 2018/0003530 A1    Jan. 4, 2018

Related U.S. Application Data

(60) Provisional application No. 62/357,799, filed on Jul. 1, 2016.

(51) Int. Cl.
G01D 11/30    (2006.01)

(52) U.S. Cl.
CPC ................. G01D 11/30 (2013.01)

(58) Field of Classification Search
CPC ................. G01D 11/30; G01F 15/04
See application file for complete search history.

(56) References Cited

U.S. PATENT DOCUMENTS

| | | | |
|---|---|---|---|
| 3,781,066 A | 12/1973 | Deli et al. | |
| 3,977,146 A | 8/1976 | Wiley | |
| 5,431,517 A | 7/1995 | Hoelle et al. | |
| 6,238,127 B1 | 5/2001 | Jhumra et al. | |
| 6,420,652 B1* | 7/2002 | Byczek | H05K 5/0073 174/152 R |
| 6,443,699 B1 | 9/2002 | Mashey | |
| 7,338,240 B2 | 3/2008 | Hohmann et al. | |
| 2009/0165940 A1* | 7/2009 | Baur | G01N 1/36 156/245 |
| 2011/0170258 A1* | 7/2011 | Single | B25F 5/008 361/688 |
| 2014/0265670 A1* | 9/2014 | Chamberlin | H02K 5/20 310/64 |
| 2016/0013869 A1* | 1/2016 | Teranishi | H04B 10/60 398/210 |
| 2016/0025571 A1* | 1/2016 | Herrmann | G01J 5/0815 250/338.1 |

* cited by examiner

*Primary Examiner* — Kevin K Pyo
*Assistant Examiner* — Don J Williams
(74) *Attorney, Agent, or Firm* — M.J. Ram and Associates

(57) ABSTRACT

A dual-threaded bushing and spacer assembly capable of accepting standard adhesive staking and thereby enabling compliance with NASA space flight fastener staking requirements. The assembly comprises a bushing having a head with top and bottom surfaces, inner threads, and outer threads, and a spacer having top and bottom surfaces and arranged to accept the bushing. This is achieved by providing a counterbored countersink in the spacer which provides a countersunk surface within the spacer. The countersunk surface provides a contact surface for the bushing head's bottom surface when the bushing is installed in the spacer. The spacer is further arranged such that the countersunk surface is such that, when the bushing is installed, the bushing's top surface is below the spacer's top surface. When so arranged, adhesive staking can be placed between the bushing's top surface and the spacer's vertical counterbored surface.

19 Claims, 4 Drawing Sheets

STACKABLE DUAL-THREADED BUSHING AND SPACER ASSEMBLY

RELATED APPLICATIONS

This application claims the benefit of provisional patent application No. 62/357,799 to Lisa L. Fischer et al., filed Jul. 1, 2016.

BACKGROUND OF THE INVENTION

Field of the Invention

This invention relates generally to spacer and bushing assemblies, and more particularly to such assemblies intended for use with focal plate arrays (FPAs) and/or Sensor Chip Assemblies (SCAs).

Description of the Related Art

A conventional spacer and bushing assembly consists of a spacer which is designed to receive a threaded bushing which serves to mount the spacer to another structure. Such assemblies are in widespread use.

Spacer and bushing assemblies are often used in spacecraft to secure various components to each other. For example, a Sensor Chip Assembly (SCA) is an imaging device found on spacecraft that requires securing to a larger package assembly. The plane of the sensor surface typically needs to be precisely positioned; to achieve proper positioning, the spacer component may be precision ground to adjust the sensor plane. Such spacers may also serve as the thermal path for the larger package assembly.

NASA may require that an adhesive be employed to prevent the possibility of fasteners becoming loose on a spacecraft; this is known as a space flight fastener "staking" requirement. For example, a spacer and bushing assembly may need to be designed to accept standard adhesive staking, but with the added requirement that the adhesive not interfere with the precision-adjusted plane of the SCA.

Previous spacer and bushing assembly designs contact and retain the spacer on the precision plane of the spacer, thereby interfering with the thermal conduction path, as well as prohibiting the implementation of adhesive staking. However, if staking cannot be employed, there is a risk that the fastener could loosen, resulting in a loss of thermal contact and precision alignment.

SUMMARY OF THE INVENTION

A dual-threaded bushing and spacer assembly is presented, which is capable of accepting standard adhesive staking and thereby enabling the assembly to comply with NASA space flight fastener staking requirements.

The present dual-threaded bushing and spacer assembly comprises a bushing having a head with top and bottom surfaces, inner threads, and outer threads, and a spacer having top and bottom surfaces and arranged to accept the bushing. This is achieved by providing a counterbored countersink in the spacer which provides a countersunk surface within the spacer. The countersunk surface provides a contact surface for the bushing head's bottom surface when the bushing is installed in the spacer. The spacer is further arranged such that the countersunk surface is such that, when the bushing is installed, the bushing's top surface is below the spacer's top surface. When so arranged, adhesive staking can be placed between the bushing's top surface and the spacer's vertical counterbored surface. The counterbored countersink preferably defines an angle of 60°-120°.

These and other features, aspects, and advantages of the present invention will become better understood with reference to the following drawings, description, and claims.

DETAILED DESCRIPTION OF THE INVENTION

Figure 1A:
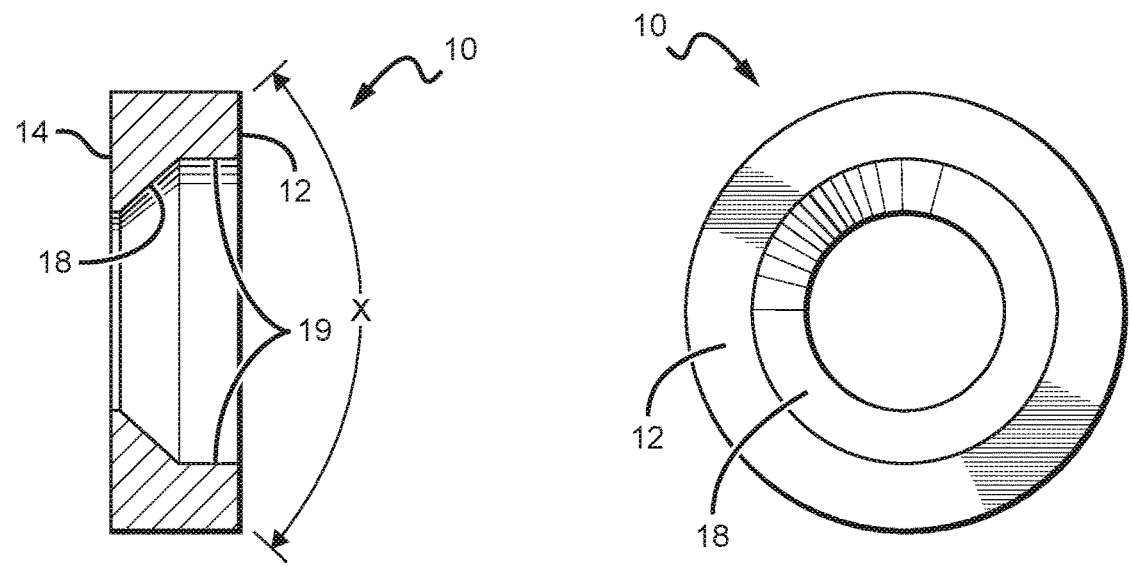
FIG. 1a shows plan and sectional views of a spacer per the present invention.
Figure 1B:
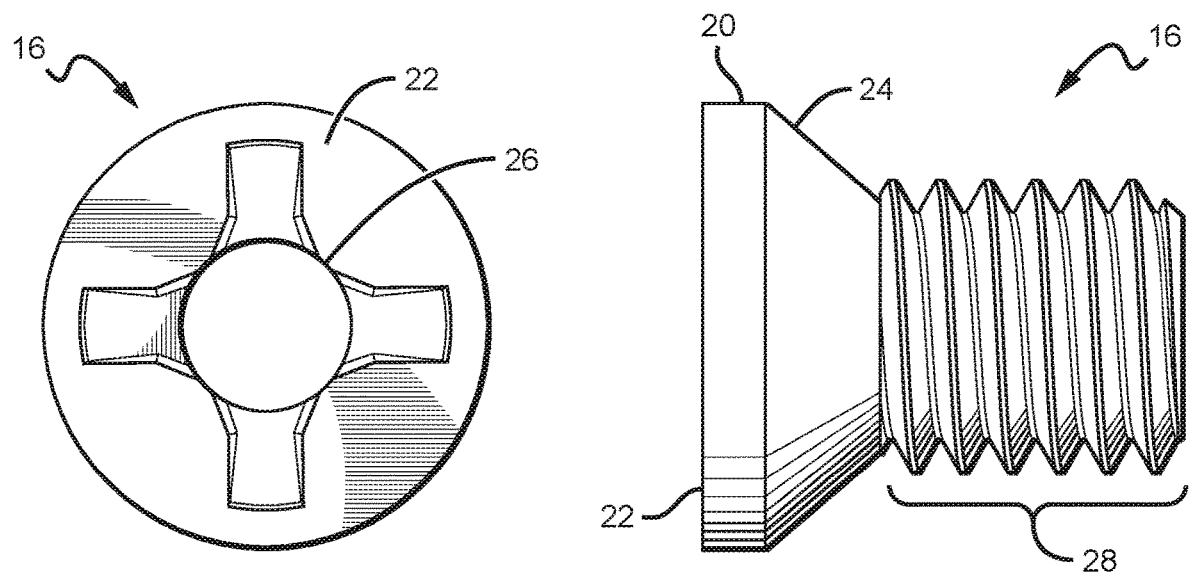
FIG. 1b shows plan and sectional views of a bushing per the present invention.

Exemplary embodiments of a spacer and a bushing as might make up a dual-threaded bushing and spacer assembly in accordance with the present invention are shown in FIGS. 1a and 1b, respectively, each of which includes a sectional view and a plan view. A spacer 10 (FIG. 1a) has top and bottom surfaces 12 and 14, and is arranged to accept a bushing 16 (FIG. 1b). The spacer 10 has a counterbored countersink which provides a countersunk surface 18 within the spacer, at the bottom of a vertical counterbored surface 19. The corresponding bushing 16 has a head 20 with a top surface 22 and a bottom surface 24, inner threads 26, and outer threads 28. The bushing's outer threads 28 are preferably sized to engage with corresponding female threads on a baseplate to which spacer 10 is to be attached.

The spacer's countersunk surface 18 provides the contact surface for the bushing head's bottom surface 24 when the bushing 16 is installed in the spacer 10. Countersunk surface 18 is arranged such that, when bushing 16 is installed, the bushing's top surface 22 is below the spacer's top surface 12. When so arranged, adhesive staking (not shown) can be placed between the bushing's top surface 22 and the spacer's vertical counterbored surface 19. The spacer's counterbored countersink preferably defines an angle X of 60°-120°, with an angle of 82° being well-suited for securing spacers to, for example, an SCA baseplate.

Figure 2:
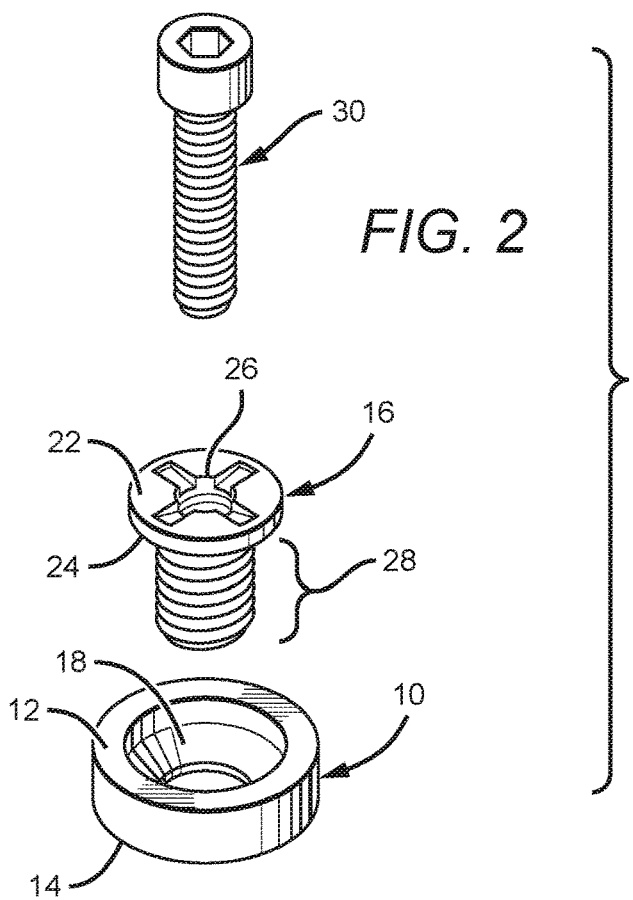
FIG. 2 is a perspective view of a dual-threaded bushing and spacer assembly per the present invention.

A perspective view of the present dual-threaded bushing and spacer assembly is shown in FIG. 2, with common reference numbers used for features that are shown in both FIGS. 1a/1b and FIG. 2. FIG. 2 further depicts a screw 30 sized to engage with the inner threads 26 of bushing 16. In practice, the outer threads 28 of bushing 16 are sized to engage with corresponding female threads on, for example, a baseplate to which spacer 10 is to be attached. Screw 30 can then be used to secure the spacer/baseplate assembly to another, larger package assembly (not shown in FIG. 2).

Figure 3:
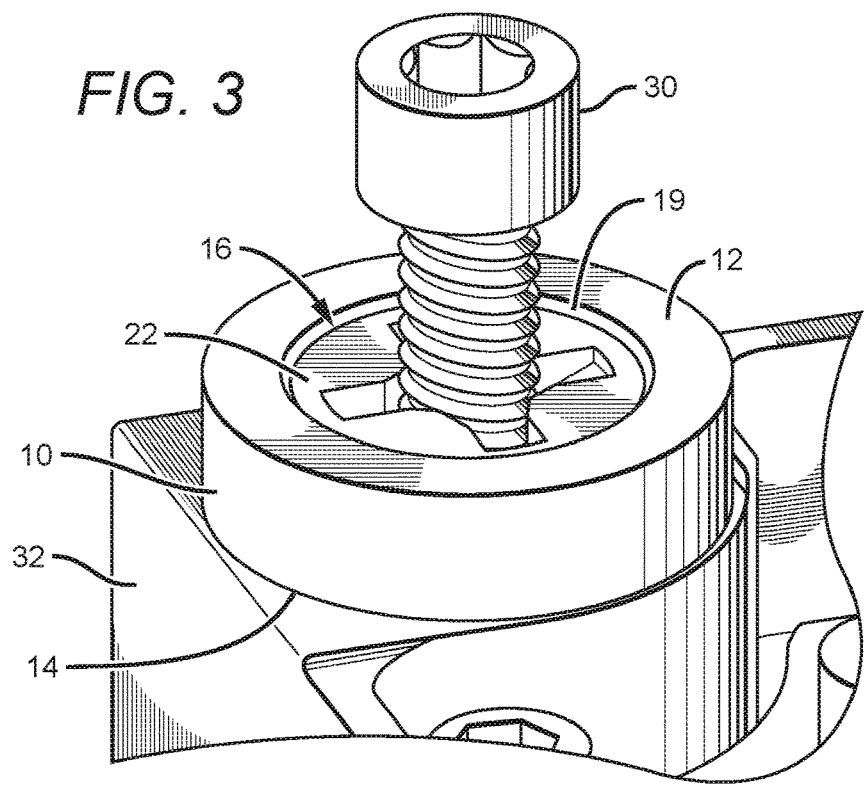
FIG. 3 is a perspective view of a dual-threaded bushing and spacer assembly per the present invention secured to a baseplate.

Using bushing 16 to secure spacer 10 to another structure is illustrated in FIG. 3. Here, bushing 16 is installed in spacer 10, with the bottom surface of bushing 16 in contact with the countersunk surface provided in the spacer. The outer threads of bushing 16 engage with corresponding threads in, for example, a baseplate 32, thereby securing the spacer to the baseplate. Then, a screw 30 can be used to secure the spacer/baseplate assembly to another, larger package assembly.

As noted above, when bushing 16 is installed, the bushing's top surface 22 is below the top surface 12 of spacer 10. Previous spacer and bushing assembly designs contact and retain the spacer on the precision plane of the spacer, thereby interfering with the thermal conduction path as well as prohibiting the implementation of adhesive staking, which may be mandatory for applications such as space flight. As a result, the fastener poses a risk that it could loosen, resulting in a loss of thermal contact and precision alignment. These problems are overcome with the present dual-threaded bushing and spacer assembly: by requiring the bushing's top surface 22 to be below the top surface 12 of the spacer, there is room between the top surface of spacer 10 and the spacer's vertical counterbored surface 34 for adhesive staking (not shown)—preferably low viscosity adhesive staking—to be applied.

One possible application of the present spacer and bushing assembly is with a SCA, with the assembly arranged such that spacers and bushings as described herein permit both precision adjustment of the active area of a SCA, as well as the ability to comply with fastener staking requirements for space flight assemblies. These objectives are achieved by recessing the bushing and spacer contact surface below the mounting surface of the packaged Sensor Chip Assembly. Staking adhesive can be applied such that it does not interfere with the heat transfer and precision height adjustment of the spacer contact surface. The spacer's countersunk surface (18) is the contact surface with bushing 16, and does not interfere with the precision plane of the ground spacer which provides the heat path for the assembly and adjusts the vertical dimension of the assembly.

The spacer can be made from a variety of different materials. Preferred spacer materials have high conductivity, high strength, and relatively low thermal expansion coefficients. Examples include members of the copper infused refractory metals like CuW or CuMo, and the Cu-Graphite material families. Spacers are preferably plated to prevent oxide formation prior to end use application. Preferred bushing materials are standard high strength fastener materials used for space or vacuum applications; examples include stainless steels, high strength titanium alloys, and high strength corrosion resistant alloys like A286.

In one embodiment, there are three spacer and bushing assemblies in each package assembly to adjust the surface profile of an SCA. The countersink is slightly recessed to accept adhesive staking. A recessed bushing also simplifies the manufacture of higher level assemblies and tooling. Variations of this spacer and bushing assembly can be modified to accommodate package assemblies with different environmental and end use requirements.

Figure 4A:
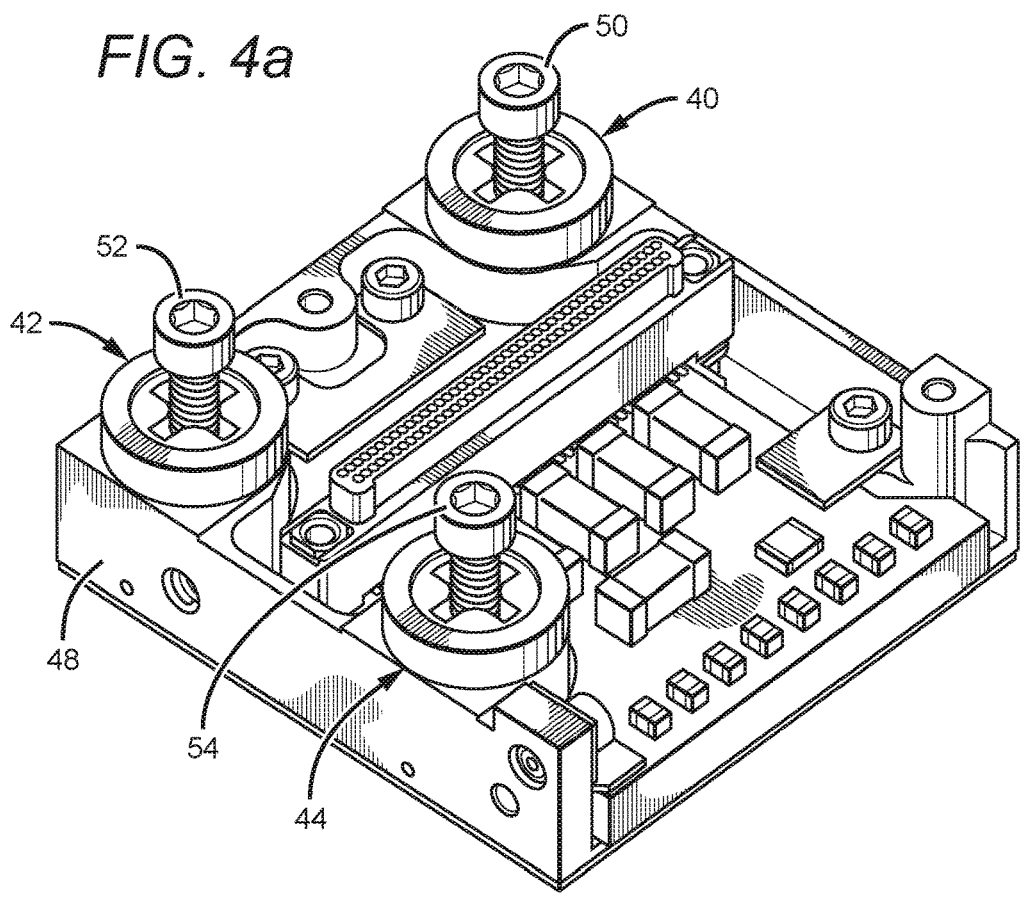
FIGS. 4a and 4b are perspective views from the top and bottom of a dual-threaded bushing and spacer assembly per the present invention, used to secure a SCA to a SCA baseplate.

Multiple bushings and spacers as described herein can be used to form respective spacer/bushing subassemblies. Such subassemblies can be used to secure, for example, a SCA to a SCA baseplate to form an imaging package, wherein the SCA has an associated active area which has an associated vertical profile; the height of the spacers can be selected, or the spacers precision-ground, to provide a desired vertical profile. An example of this application is shown in FIGS. 4a (top perspective view) and 4b (bottom perspective view). Here, three spacer/bushing subassemblies 40, 42, 44 secure SCA 46 to a SCA baseplate 48. The spacers of the subassemblies provide a thermal heat path for the SCA. The spacer and bushing assemblies can be used to adjust the surface profile of SCA.

Figure 4B:
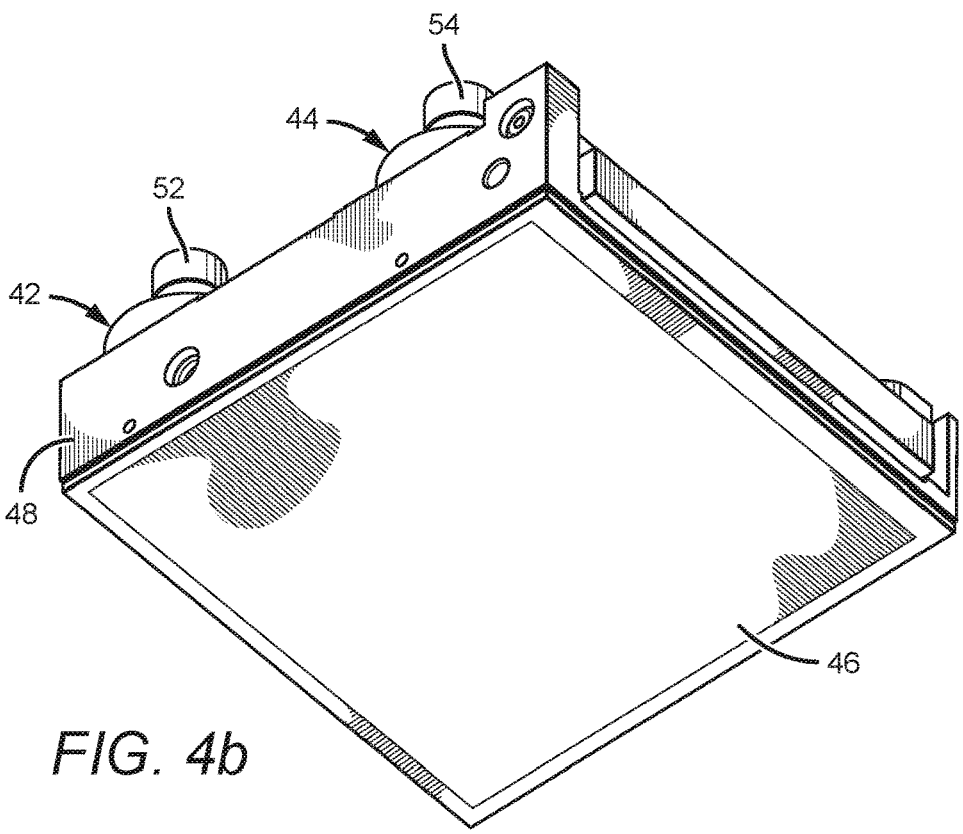

As noted above, the bushing is dual-threaded. The bushing has an external thread (28) which mounts the spacer and bushing to a larger package assembly (such as baseplate 48 in FIGS. 4a and 4b), and an internal thread (26) which accepts hardware to mount the entire package assembly to, for example, an instrument assembly. This is illustrated in FIGS. 4a and 4b, in which screws 50, 52, 54 mount SCA 46 and baseplate 48 to another assembly (not shown).

As noted above, the spacer's counterbored countersink preferably defines an angle of 60°-120°. This improves the colocation of the spacer and bushing when threaded onto the package assembly. The countersink of the spacer begins at the bottom of a counterbore that is deep enough for the entire bushing to be embedded within the spacer when fully installed. A small clearance between the wall of the counterbore and the head of the bushing can be filled with adhesive staking that can prevent the bushing from backing out of the package assembly.

Figure 5:
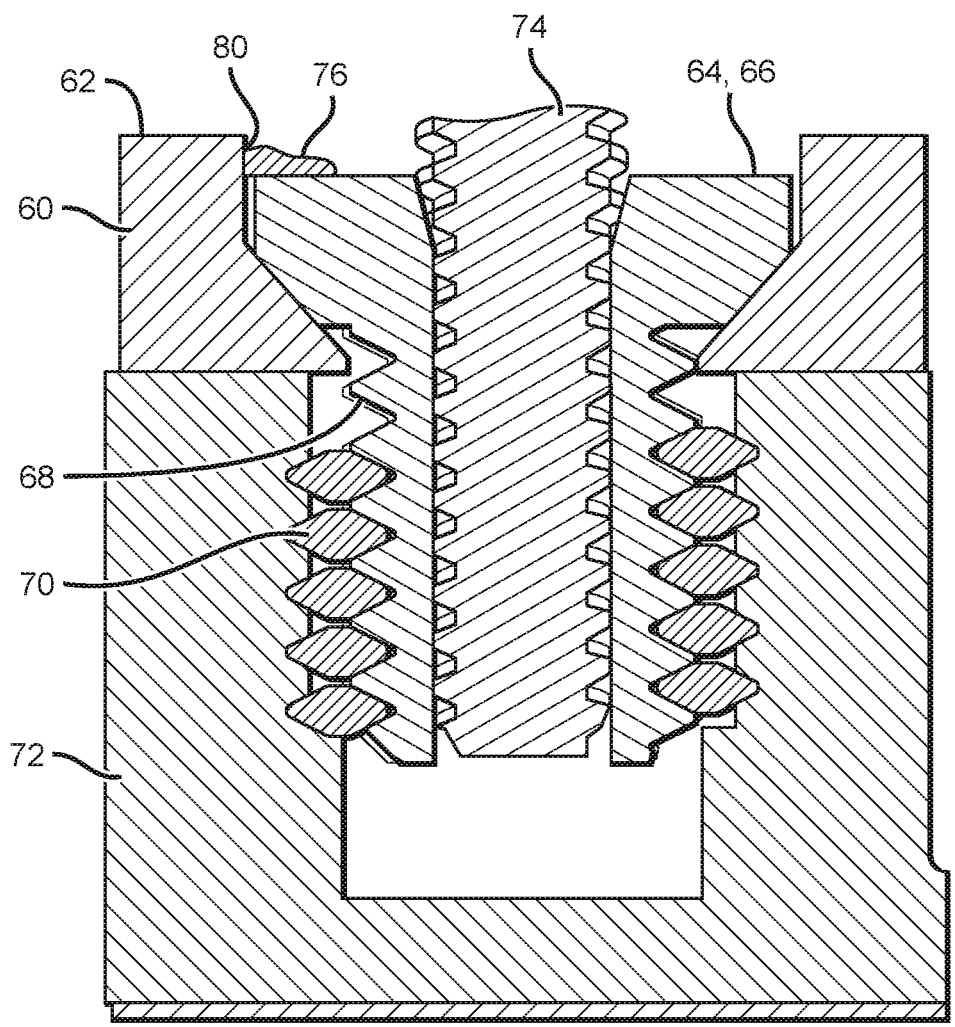
FIG. 5 is a sectional view of a dual-threaded bushing and spacer assembly per the present invention which includes adhesive staking.

A key advantage of the present bushing and spacer assembly is the ability to accept adhesive staking and thereby comply with NASA space flight fastener staking requirements. This is illustrated using the sectional view shown in FIG. 5. The assembly includes a spacer 60 having a top surface 62, and a bushing 64 having a top surface 66. The bushing's outer threads 68 engage with receiving threads 70 on another component 72, and hardware such as a screw 74 secure spacer 60 and component 72 to yet another assembly (not shown). The bushing and spacer assembly are arranged such that the bushing's top surface 66 is below the spacer's top surface 62. This allows adhesive staking 76 to be placed between the bushing's top surface and the spacer's vertical counterbored surface 80.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A dual-threaded bushing and spacer assembly, comprising:
 a bushing having a head with top and bottom surfaces, inner threads, and outer threads; and
 a spacer distinct from said bushing and having top and bottom surfaces and arranged to accept said bushing, said spacer having a counterbored countersink which provides a countersunk surface within said spacer, said countersunk surface providing the contact surface for said bushing head's bottom surface when said bushing is installed in said spacer, said countersunk surface such that, when said bushing is installed, said bushing's top surface is below said spacer's top surface.

2. The bushing and spacer assembly of claim 1, wherein said outer threads are sized to engage with corresponding female threads on a baseplate to which said spacer is to be secured.

3. The bushing and spacer assembly of claim 2, wherein said baseplate is a sensor chip assembly (SCA) baseplate.

4. The bushing and spacer assembly of claim 3, wherein multiple ones of said bushings and spacers form respective spacer/bushing subassemblies which secure a SCA to said SCA baseplate, wherein said SCA has an associated active area which has an associated vertical profile, the height of said spacers selected to provide a desired vertical profile.

5. The bushing and spacer assembly of claim 4, wherein said multiple spacer/bushing subassemblies consists of three spacer/bushing subassemblies.

6. The bushing and spacer assembly of claim 4, wherein said spacers provide a thermal heat path for said SCA.

7. The bushing and spacer assembly of claim 1, further comprising adhesive staking placed between said bushing's top surface and said spacer's vertical counterbored surface.

8. The bushing and spacer assembly of claim 1, wherein said spacer comprises a copper-infused refractory metal.

9. The bushing and spacer assembly of claim 8, wherein said spacer comprises metal from the CuW, CuMo and Cu-Graphite material families.

10. The bushing and spacer assembly of claim 1, wherein said bushing comprises a stainless steel, a titanium alloy, or a corrosion-resistant alloy.

11. The bushing and spacer assembly of claim 1, wherein said counterbored countersink defines an angle of 60°-120°.

12. The bushing and spacer assembly of claim 11, wherein said counterbored countersink defines an angle of 82°.

13. An imaging package, comprising:
  a sensor chip assembly (SCA) baseplate having at least one set of female threads;
  a plurality of spacer/bushing subassemblies, each of which comprises:
    a bushing having a head with top and bottom surfaces, inner threads, and outer threads, said outer threads sized to engage with one of said at least one set of female threads on said SCA baseplate; and
    a spacer distinct from said bushing and having top and bottom surfaces and arranged to accept said bushing, said spacer having a counterbored countersink which provides a countersunk surface within said spacer, said countersunk surface providing the contact surface for said bushing head's bottom surface when said bushing is installed in said spacer, said countersunk surface such that, when said bushing is installed, said bushing's top surface is below said spacer's top surface; and
  a SCA secured to said SCA baseplate using said plurality of spacer/bushing subassemblies.

14. The SCA of claim 13, wherein said SCA has an associated active area which has an associated vertical profile, the height of said spacers selected to provide a desired vertical profile.

15. The SCA of claim 13, wherein said spacers provide a thermal heat path for said SCA.

16. The SCA of claim 13, wherein each of said spacer/bushing subassemblies further comprises adhesive staking placed between the top surface of said subassembly's bushing and said spacer's vertical counterbored surface.

17. The SCA of claim 13, further comprising screws sized to engage with the inner threads of said bushings.

18. The SCA of claim 13, wherein said counterbored countersink defines an angle of 60°-120°.

19. The SCA of claim 18, wherein said counterbored countersink defines an angle of 82°.

* * * * *